(12) United States Patent
Ro et al.

(10) Patent No.: US 8,698,974 B2
(45) Date of Patent: Apr. 15, 2014

(54) RECEIVING MODULE, MANUFACTURING METHOD OF THE SAME, AND LIQUID CRYSTAL DISPLAY WITH THE SAME

(75) Inventors: Seung-Mock Ro, Yongin (KR); Sang-Hee Lee, Yongin (KR); Tae-Joon Kim, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 266 days.

(21) Appl. No.: 13/067,769

(22) Filed: Jun. 24, 2011

(65) Prior Publication Data
US 2012/0182492 A1  Jul. 19, 2012

(30) Foreign Application Priority Data

Jan. 18, 2011 (KR) ........................ 10-2011-0005070

(51) Int. Cl.
*G02F 1/1333* (2006.01)

(52) U.S. Cl.
USPC .............................................. 349/60; 349/58

(58) Field of Classification Search
USPC .................................................... 349/58–65
See application file for complete search history.

(56) References Cited

U.S. PATENT DOCUMENTS 6,292,239 B1 * 9/2001 Nagamura et al. .............. 349/61
7,488,105 B2 * 2/2009 Kuo ................................ 349/58

FOREIGN PATENT DOCUMENTS

| KR | 10-2008-0089897 A | 10/2008 |
| KR | 10 2010-0039189 A | 4/2010 |
| KR | 10 2010-0066136 A | 6/2010 |

* cited by examiner

*Primary Examiner* — Dung Nguyen
(74) *Attorney, Agent, or Firm* — Lee & Morse, P.C.

(57) ABSTRACT

A receiving module of a liquid crystal display panel includes a mold frame and a bottom chassis. The mold frame forms an internal space that receives a backlight unit. The bottom chassis includes a bottom portion facing a rear side of the mold frame and includes side walls connected with the bottom portion and facing an outer side of the mold frame. At least one of the side walls includes a fastening protrusion in at least one side thereof, and the mold frame includes a groove portion that receives, at an outer side thereof, the at least one side wall including the fastening protrusion such that the mold frame is coupled to an inner side of the side wall and the fastening protrusion.

15 Claims, 8 Drawing Sheets

RECEIVING MODULE, MANUFACTURING METHOD OF THE SAME, AND LIQUID CRYSTAL DISPLAY WITH THE SAME

RELATED APPLICATIONS

This application claims priority to and the benefit of Korean Patent Application No. 10-2011-0005070 filed in the Korean Intellectual Property Office on Jan. 18, 2011, the entire contents of which are incorporated herein by reference.

BACKGROUND

Embodiments relate to a liquid crystal display (LCD). The LCD may be thin, light-weight, and consume less power so that it has been applied to mobile electronic devices such as a portable communication terminal, and large-sized display home electronics. The LCD may include a liquid crystal display panel and a backlight unit providing light to the liquid crystal display panel.

The above information disclosed in this Background section is only for enhancement of understanding of the background of the described technology and therefore it may contain information that does not form the prior art that is already known in this country to a person of ordinary skill in the art.

SUMMARY

Embodiments may be realized by providing a mold frame forming an internal space for receiving a backlight unit; and a bottom chassis including a bottom portion facing a rear side of the mold frame and side walls connected with the bottom portion and facing an outer side of the mold frame. The side wall forms a fastening protrusion in at least one side thereof, and the mold frame forms a groove portion receiving the side wall at an outer side thereof such that the mold frame is coupled to an inner side of the side wall and the fastening protrusion.

The fastening protrusion may be formed throughout the side of the side wall along the height direction of the side wall at both sides of the side wall. The groove portion may have a depth that is the same as the thickness of the side wall, and may include a fastening groove portion formed in the opposite shape of the fastening protrusion.

The fastening protrusion may be formed in the shape of a triangular pyramid including two symmetric inclined planes. Alternatively, the fastening protrusion may be formed in the shape of a triangular corn including a single inclined plane.

Embodiments of method of manufacturing a receiving module may also be provided by preparing a metal plate including a bottom area and a side wall area; forming a fastening protrusion by processing at least one side of the side wall area; manufacturing a bottom chassis including a bottom portion and a side wall by bending the side wall area from the bottom area; manufacturing a mold frame by installing the bottom chassis in a mold former, and injecting polymer resin into an inner space of the mold former, and then hardening the polymer resin. An inner side of the side wall and the fastening protrusion are combined with the mold frame.

The fastening protrusion may be formed throughout the side of the side wall along the height direction of the side wall at both sides of the side wall. The fastening protrusion may be formed in the shape of a triangular pyramid including two symmetric inclined planes, or may be formed in the shape of a triangular corn including a single inclined plane.

A liquid crystal display according to another exemplary embodiment includes: a liquid crystal display panel displaying an image; a backlight unit disposed at a rear side of the liquid crystal display panel; a mold frame disposed at an outer side of the liquid crystal display panel and the backlight unit; and a bottom chassis including a bottom portion facing the mold frame and the rear side of the backlight unit and side walls connected with the bottom portion and facing an outer side of the mold frame. The side wall forms a fastening protrusion in at least one side thereof, and the mold frame forms a groove portion for receiving the side wall in an outer side thereof such that the mold frame is combined to an inner side of the side wall and the fastening protrusion.

The fastening protrusion may be formed throughout the side of the side wall along the height direction of the side wall at both sides of the side wall. The groove portion may have a depth that is the same as the thickness of the side wall, and may include a fastening groove portion formed in the opposite shape of the fastening protrusion.

The fastening protrusion may be formed in the shape of a triangular pyramid having two symmetric inclined planes, or may be formed in the shape of a triangular corn having a single inclined plane.

The mold frame may be formed in the shape of a rectangular frame, and may form a receiving groove at an inner side thereof to support edges of the liquid crystal display panel.

DETAILED DESCRIPTION

Figure 1:
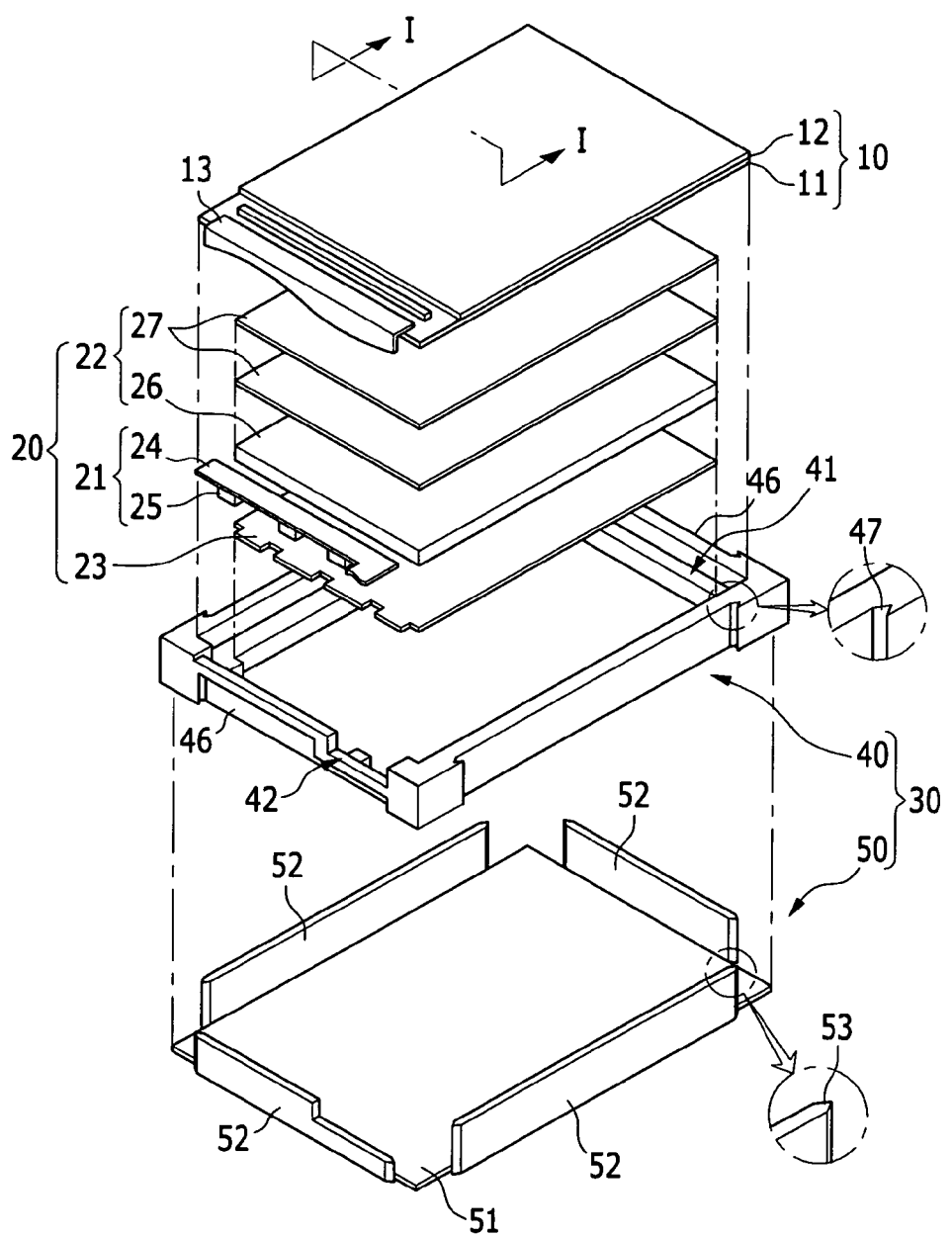
FIG. 1 illustrates an exploded perspective view of a liquid crystal display (LCD), according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of layers and regions may be exaggerated for clarity of illustration. It will also be understood that when an element is referred to as being "on" another element, it can be directly on the other element, or intervening elements may also be present. Like reference numerals refer to like elements throughout.

Figure 2:
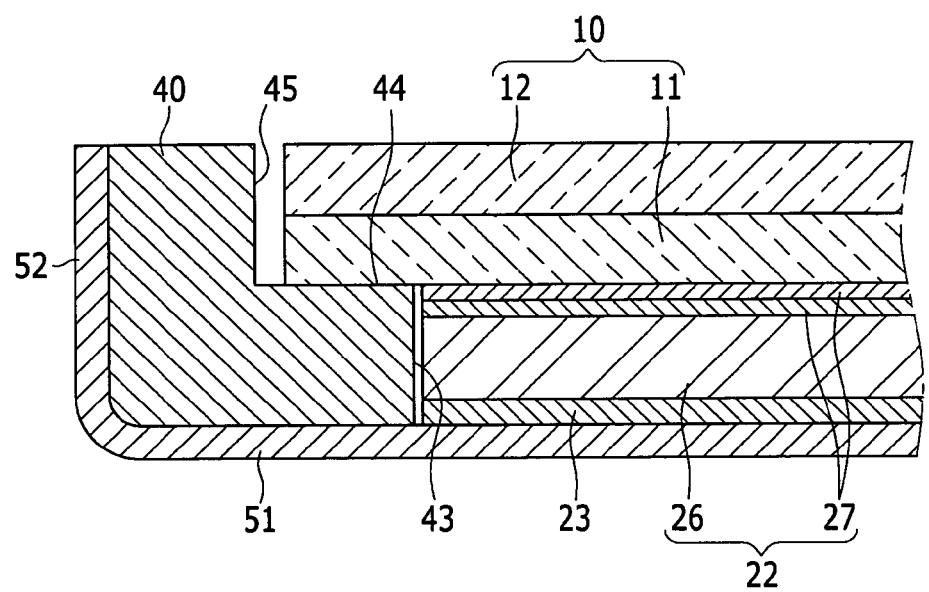
FIG. 2 illustrates a cross-sectional view showing an assembled state of the LCD of FIG. 1, taken along the line I-I.

FIG. 1 illustrates an exploded perspective view of an LCD according to a first exemplary embodiment, and FIG. 2 illustrates a cross-sectional view showing an assembled state of the LCD of FIG. 1, taken along the line I-I.

Referring to FIG. 1 and FIG. 2, a liquid crystal display (LCD) 100 may include a liquid crystal display panel 10, a backlight unit 20, and a receiving module 30. The backlight unit 20 may provide light to the liquid crystal display panel 10, and the liquid crystal display panel 10 may display an image by controlling a light transmission amount for each pixel therein. The receiving module 30 may be formed of an assembly of a mold frame 40 and a bottom chassis 50.

The liquid crystal display panel 10 may include a thin film transistor substrate 11, a color filter substrate 12, and a liquid crystal layer (not shown) injected between the two substrates 11 and 12. A polarizing plate (not shown) may be disposed at an outer side of at least one of the thin film transistor substrate 11 and the color filter substrate 12. A flexible circuit board 13 may be fixed to one end of the thin film transistor substrate 11.

The flexible circuit board 13 may be bent toward, e.g., to, the rear side of the bottom chassis 50. The flexible circuit board 13 may be connected with a panel driver (not shown) formed of a printed circuit board where, e.g., a driving circuit is mounted. The flexible circuit board 13 may transmit a video signal and a driving voltage generated from the panel driver to the thin film transistor substrate 11. Various types, e.g., all types disclosed, of liquid display panels may be used as the liquid crystal display panel 10.

The backlight unit 20 may include a light source unit 21, a light guide unit 22, and a reflection film 23. The backlight unit 20 may be disposed at a rear portion of the liquid crystal display panel 10. The light source unit 21 may be formed of a printed circuit film 24 and at least one light emitting diode 25 fixed to the printed circuit film 24. The light source unit 21 may include, e.g., a cold cathode fluorescent lamp (CCFL), that is, a linear light source instead of the light emitting diode 25, that is, a dot light source.

The light guide unit 22 may include a light guiding plate 26 and at least one optical sheet 27. For example, referring to FIG. 1, the light guide 22 may include a plurality of optical sheets 27. The light guiding plate 26 may be disposed at one side of the light source unit 21. The light guiding plate 26 may receive light emitted from the light source unit 21 and may uniformly transmit the light to the liquid crystal display panel 10.

At least one optical sheet 27 may be disposed between the light guiding plate 26 and the liquid crystal display panel 10. The optical sheet 27 may include a diffusion sheet and a prism sheet. The diffusion sheet may diffuse light supplied from the light guiding plate 26 and may enhance straightness of the light diffused by the diffusion sheet. The reflection film 23 may be disposed at a rear side of the light guiding plate 26, and may reflect light leaked to a lower portion of the light guiding plate 26 to frontward.

Figure 3:
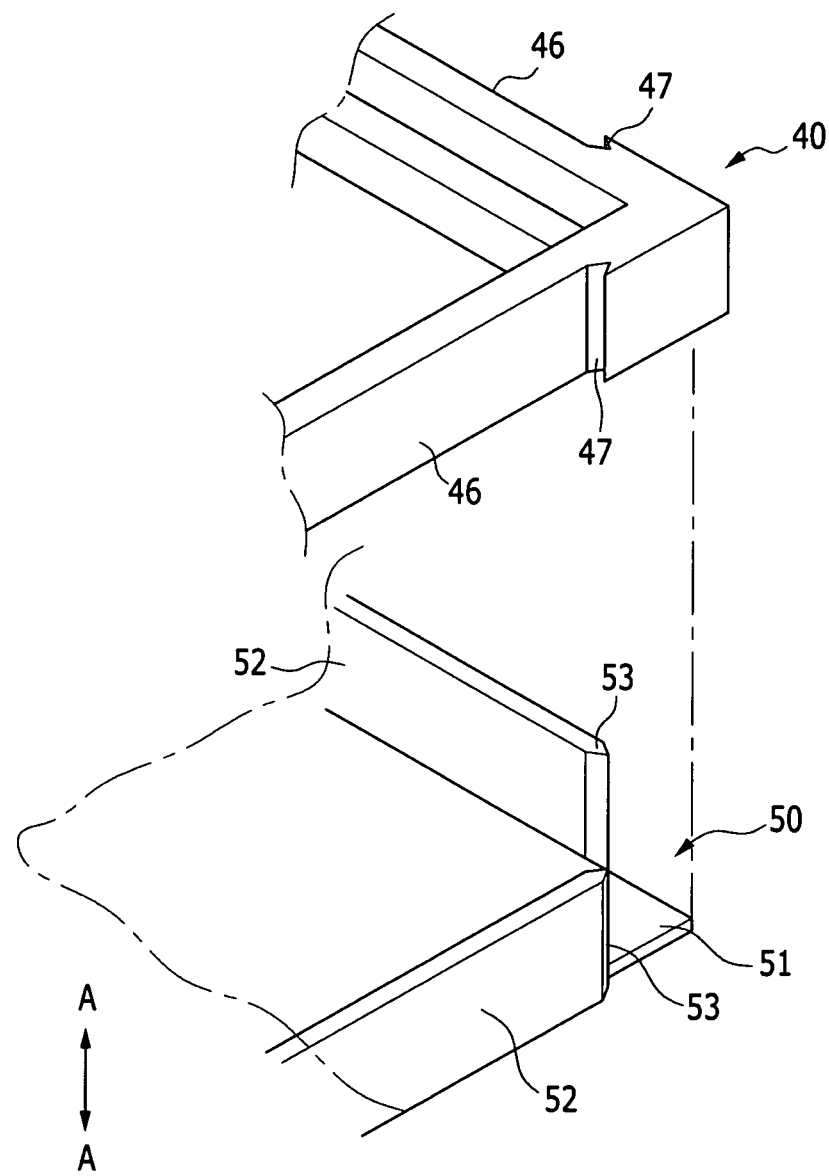
FIG. 3 illustrates a partially exploded perspective view of the LCD of FIG. 1.
Figure 4:
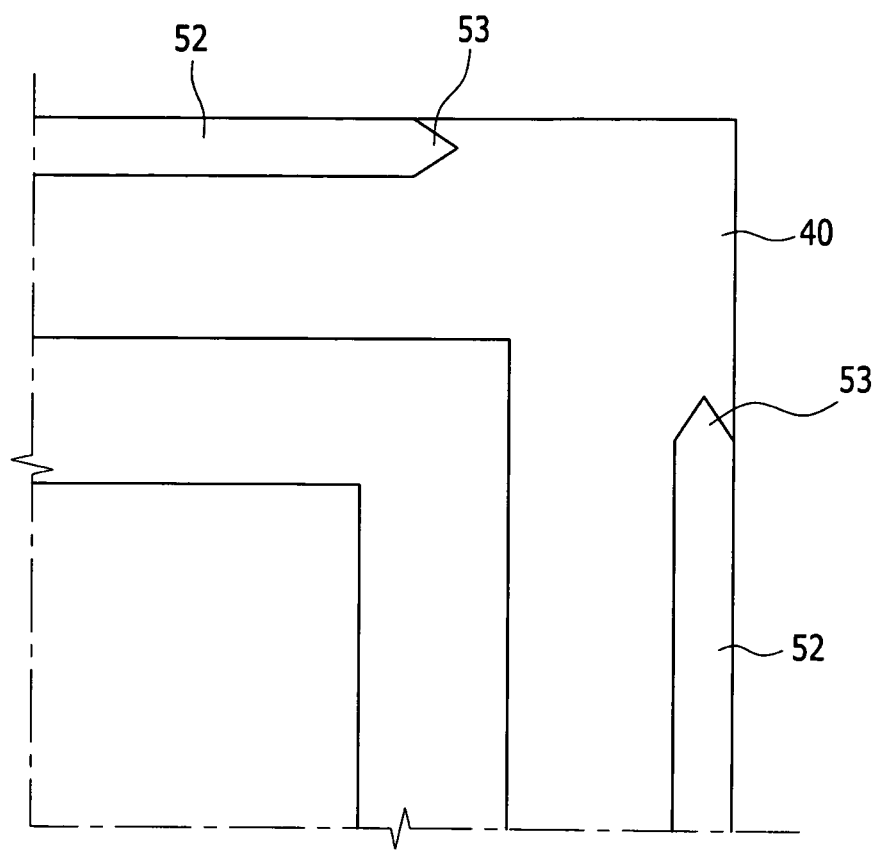
FIG. 4 illustrates a top plan view showing an assembled state of a receiving module of FIG. 3.

FIG. 3 illustrates a partially exploded perspective view of the receiving module of the LCD of FIG. 1, and FIG. 4 illustrates a top plan view showing an assembled state of the receiving module of FIG. 3.

Referring to FIG. 1 to FIG. 4, the mold frame 40 may be formed in any polygonal shape, e.g., the shape of a rectangle having an opening at a center thereof. The mold frame 40 may be formed with polymer resin such as plastic. The backlight unit 20 and the liquid crystal display panel 10 may be disposed in the mold frame 40. The mold frame 40 may support the backlight unit 20 and the liquid crystal display panel 10 by surrounding sides, e.g., lateral sides, of the backlight unit 20 and the liquid crystal display panel 10.

The mold frame 40 may form a receiving groove 41 formed in the shape of steps at an inner side of the mold frame to, e.g., hold and/or receive parts of the liquid crystal display device 100. For example, the backlight unit 20 may be seated on the receiving groove 21. The mold frame 40 may have formed thereon a passing groove 42 for passing of the flexible circuit board 13 and the printed circuit film 24 at one upper side thereof. For example, the passing groove 42 may be an opening on a lateral side of the mold frame 40 that accommodates portions of the flexible circuit board 13 and the printed circuit film 24.

Referring to FIG. 2, an inner side of the mold frame 40 may be divided into a lower side 43 facing toward the bottom chassis 50, a support side 44 crossing, e.g., perpendicularly crossing, the lower side 43, and an upper side 45 crossing, e.g., perpendicularly crossing, the support side 44. That is, the lower side 43, the support side 44, and the upper side 45 form the receiving groove 41.

The backlight unit 20 may be disposed at an inner side of the lower side 43, e.g., a lateral side of the backlight unit 20 may be adjacent to the lower side 43. According to an exemplary embodiment, a height of the lower side 43 may correspond to a thickness of the backlight unit 20. The liquid crystal display panel 10 may be disposed on the support side 44 and on the backlight unit 20 at an inner side of the upper side 45. For example, the liquid crystal display panel 10 may be seated, e.g., in an overlapping relationship, on the support side 44, and a lateral side of the liquid crystal display panel 10 may be adjacent to the upper side 45. An adhesive sheet (not shown) may be disposed directly above the support side 44 of the mold frame 40 and the edge of the backlight unit 20 to fix the liquid crystal display panel 10.

The bottom chassis 50 may include a bottom portion 51 facing rear sides of the mold frame 40 and the backlight unit 20. The bottom chassis 50 may include a plurality of side walls 52 connected to, e.g., directly coupled to, respective edges of the bottom portion 51 and facing the outer side of the mold frame 40. The plurality of side walls 52 may be integrally formed with the bottom portion 51, and may be bent from the bottom portion 51 such that a substantially perpendicular state with respect to the bottom portion 51 may be maintained. The bottom chassis 50 may be formed with a metal such as stainless steel.

Since the mold frame 40 may have a frame shape, e.g., a rectangular frame shape, without having a bottom portion thereof, the backlight unit 20 may be disposed on the bottom portion 51 of the bottom chassis 50. In this case, the thickness of the LCD 100 may be reduced, thereby manufacturing a thinner LCD. A buffering sheet (not shown) may be disposed between the backlight unit 20 and the bottom portion 51 of the bottom chassis 50 in order to absorb external impact.

The bottom chassis 50 may be provided with four side walls 52. Three of the four side walls 52 may have respective heights that are equivalent to the thickness of the mold frame 40. The remaining one side wall 40 may have a thickness that is smaller than the thickness of the mold frame 40.

The flexible circuit board 13 fixed to the liquid crystal display panel 10 may surround one side wall 52 passing through the passing groove 42 of the mold frame 40 and then bent backward of the bottom chassis 50. The side wall 52 surrounded by the flexible circuit board 13 may have a height that is smaller than heights of other three side walls 52.

A plurality of groove portions 46 corresponding to the shape of the side walls 52 of the bottom chassis 50 may be formed at an outer side of the mold frame 40. Thus, the bottom chassis 50 may be combined with the mold frame 40 in a manner that the plurality of side walls 52 are disposed while filling corresponding groove portions 46. Each groove portion 46 may have a depth that is equivalent to the thickness of each side wall 52. An outer side of the side wall 52 may be disposed in parallel, e.g., may be vertically aligned, with an outer side of the mold frame 40 where the groove portion 46 is not formed.

The receiving module 30 may be manufactured in a manner that the bottom chassis 50 is manufactured first and then the mold frame 40 is formed by injection molding polymer resin on the bottom chassis 50 rather than in a manner that the mold frame 40 and the bottom chassis 50 are independently manufactured and then assembled with each other. This manner is called insert injection molding. In this case, the mold frame 40 and the bottom chassis 50 may be integrally formed so that they have a strong bonding force.

Among the four side walls 52 of the bottom chassis 50, a fastening protrusion 53 may be formed to enlarge the surface area in at least one side of at least one side wall 52. The fastening protrusion 53 may be formed extending along the height direction (A-A direction of FIG. 3) on a side surface of the side wall 52. The fastening protrusion 53 may be formed at two sides surfaces, e.g., on both opposing edges, of the side wall 52. For example, the fastening protrusion 53 may be formed in the shape of a triangular pyramid, e.g., having two symmetric inclined planes, on the side surface of the side wall 52.

The fastening protrusion 53 enlarges the contact area of the mold frame 40 and the side wall 52 by enlarging the surface area of the side surface of the side wall 52, and may enhance the bonding force between the bottom chassis 50 and the mold frame 40 by providing a protrusion-groove fastening structure between the side wall 52 and the mold frame 40. When the fastening protrusion 53 is not disposed at the side of the side wall 52, e.g., in the case that the side of the side wall 52 is perpendicular to inner and outer sides of the side wall 52, the contact area of the side wall and the mold frame is smaller because the protrusion-groove fastening structure is not formed.

The groove portion 46 of the mold frame 40 may include a fastening groove portion 47 formed in the opposite shape of the fastening protrusion 53. For example, if the fastening protrusion 53 has a shape of a convex form having two symmetric inclined planes, the fastening groove portion 47 may be formed by the two inclined planes that are symmetrically in a concave form. The mold frame 40 may be attached to the inner side of the side wall 52 and the pair of fastening protrusions 53. Thus, the mold frame 40 may be strongly fixed to the side wall 52, and the bonding force between the side wall 52 and the mold frame 40 may be reinforced at both sides of the side wall 52 by the bonding structure between the fastening protrusion 53 and the fastening groove portion 47.

Thus, the mechanical strength of the receiving module 30 may be improved, thereby reducing and/or minimizing damage to the receiving module 30 due to, e.g., external impact such as drop impact. The drop impact may tend to be concentrated to a corner portion of the receiving module 30, that is, a corner portion of the mold frame 40. Therefore, the side wall of the bottom chassis 50 may be firmly combined with the corner portion of the mold frame 40 by combination of the fastening protrusion 53 and the fastening groove portion 47, and damage to the corner portion of the mold frame 40 may be reduced and/or minimized.

FIG. 1 exemplarily illustrates that the fastening protrusions 53 as being formed at both sides of each of the four side walls 52 provided in the bottom chassis 52. However, at least one side of at least one side wall 52 may not be provided with the fastening protrusion 53, as necessary.

Figure 5:
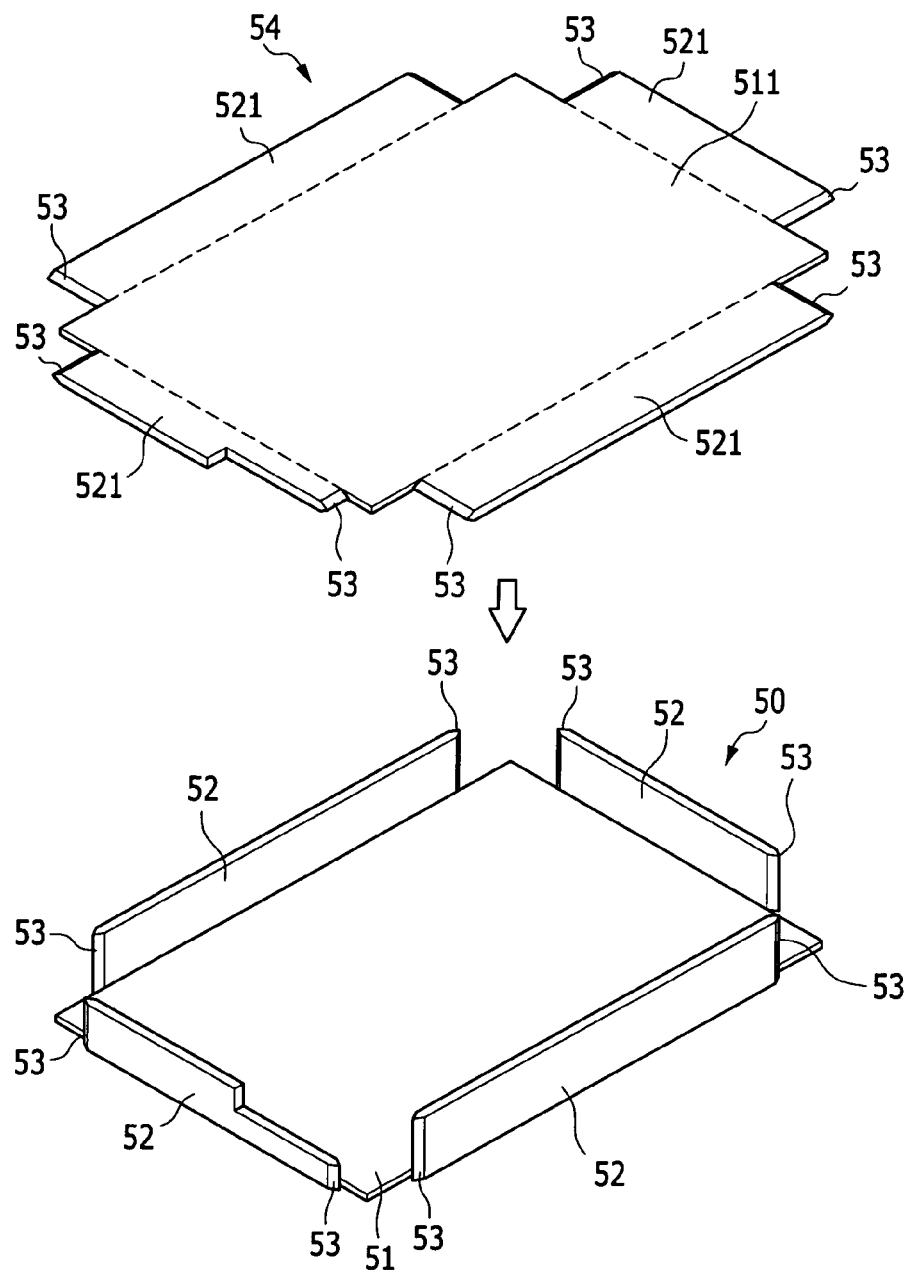
FIG. 5 and FIG. 6 illustrate schematic diagrams of a manufacturing process of a receiving module of FIG. 1.
Figure 6:
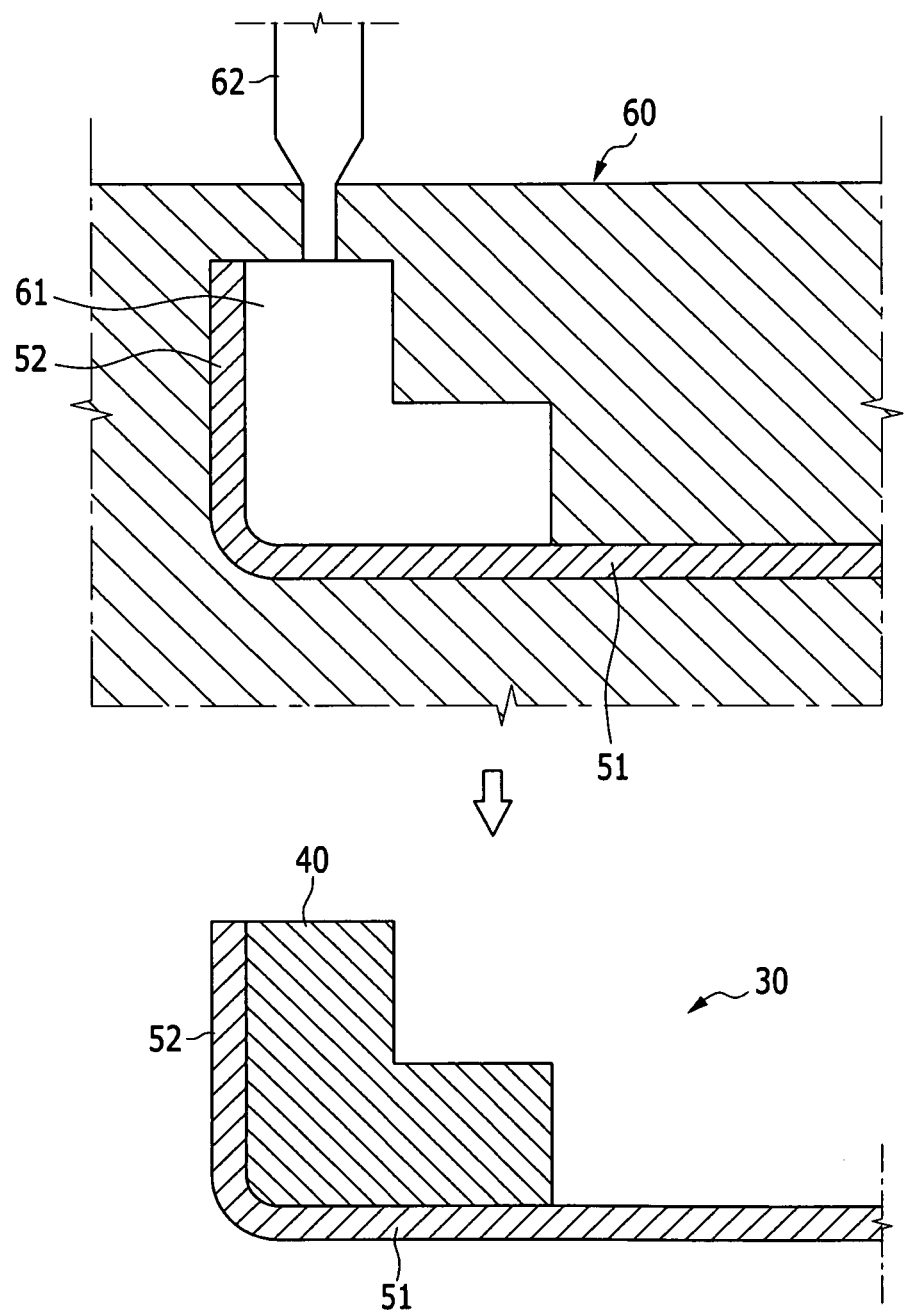

FIG. 5 and FIG. 6 are schematic diagrams of a manufacturing process of the receiving module of FIG. 1.

Referring to FIG. 5 and FIG. 6, a method of manufacturing the receiving module 30 includes a step for preparing a metal plate 54. The metal plate may include a bottom area 511 and a plurality of side wall area 521. Then the fastening protrusions 53 may be formed by processing a side of the side wall area 521. Before or after forming the fastening protrusions 53, the shape of the bottom chassis 50 may be formed by bending the plurality of side wall areas 521 substantially 90 degrees. The completed bottom chassis 50 may be formed of the bottom portion 51 and the plurality of side walls 52 where the fastening protrusion 53 is formed at the sides of various side walls 52.

The manufacturing method of the receiving module 30 may further include installing the manufactured bottom chassis 50 in a mold former 60 and then forming the mold frame 40 by injecting a liquid-type polymer resin into an inner space of the mold former 60 and hardening the resin.

The mold former 60 may form an internal space in the same shape of the mold frame 40, and the polymer resin may be injected into the internal space 61 of the mold former 60 through an injection nozzle 62. The mold frame 40 may include a groove portion 46, e.g., as illustrated in FIG. 3, to receive the side wall 52.

Figure 7:
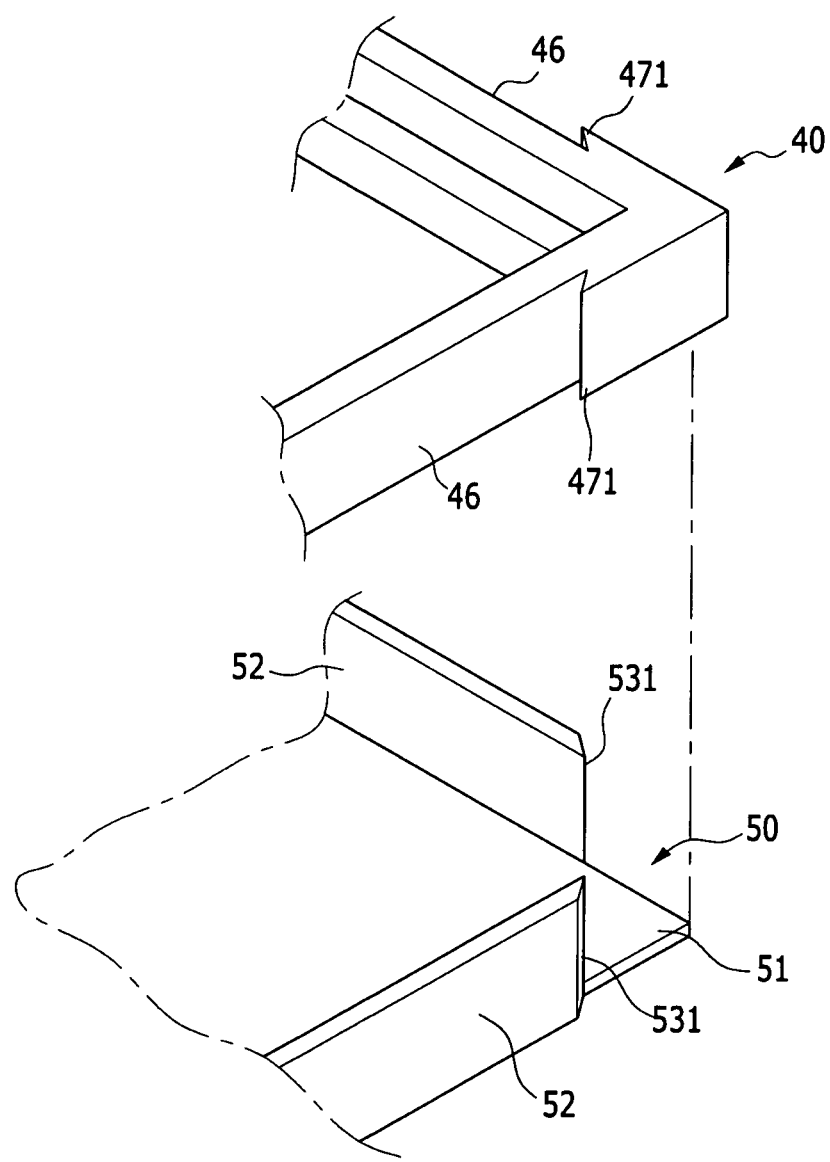
FIG. 7 illustrates an exploded perspective view of a receiving module of an LCD, according to an exemplary embodiment.
Figure 8:
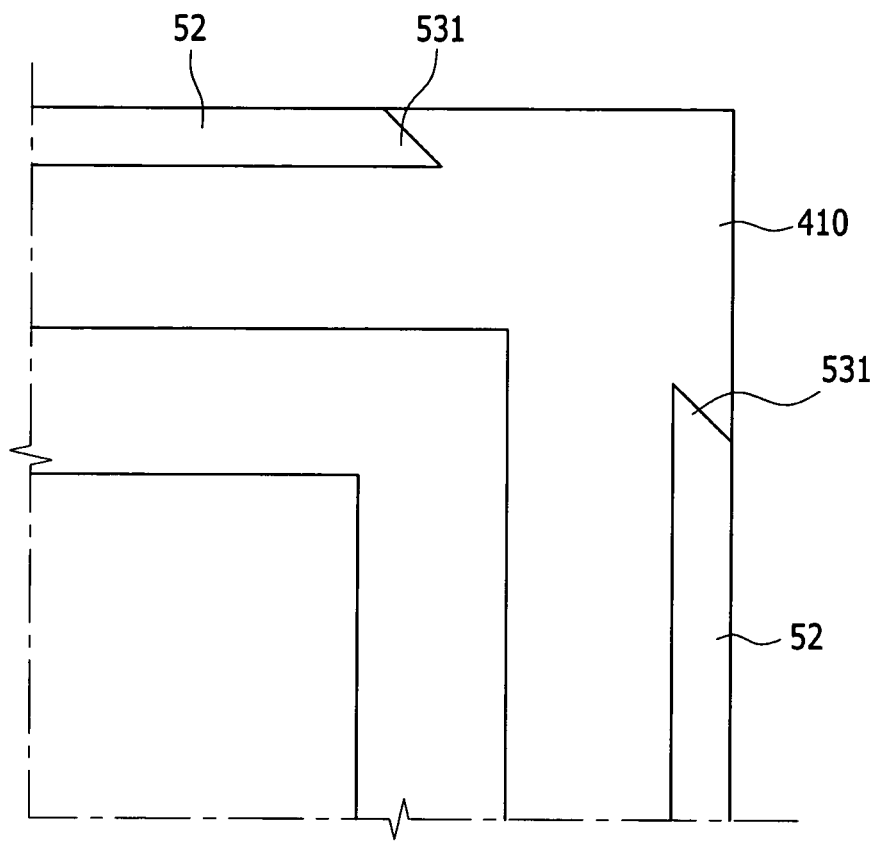
FIG. 8 illustrates a top plan view showing an assembled state of the receiving module of FIG. 7.

FIG. 7 illustrates an exploded perspective view of a receiving module of an LCD according to a second exemplary embodiment, and FIG. 8 illustrates a top plan view showing an assembled state of the receiving module of FIG. 7. FIG. 7 and FIG. 8 illustrate partially enlarged views of the receiving module.

Referring to FIG. 7 and FIG. 8, the LCD according to the second exemplary embodiment may have substantially the same configuration as the LCD according to the first exemplary embodiment. However, in the second exemplary embodiment, a fastening protrusion 531 of a bottom chassis 510 may be formed in the shape of a triangular wedge, e.g., a sloped plane, including a single inclined plane. A corresponding fastening groove portion 471 of a mold frame 410 may be formed in the opposite shape of the fastening protrusion 531. Like reference numerals designate like elements as those of the first exemplary embodiment.

A sharp end of the fastening protrusion 531 of a side wall 52 may be surrounded by the mold frame 410 such that a triangular wedge shaped protrusion-groove fastening structure with the mold frame 410 is formed. Bonding force reinforcement between the mold frame 410 and the bottom chassis 510 by the fastening protrusion 531 and an effect for reducing, minimizing, and/or preventing damage to a corner portion of the mold frame 410 may be the same as those of the first exemplary embodiment. In addition, a manufacturing method of the receiving module 30 according to the second exemplary embodiment is the same as the above-described manufacturing method described with reference to FIG. 5 and FIG. 6, excluding the shape of the fastening protrusion 531, and therefore no further description will be provided.

By way of summation and review, a liquid crystal display panel and a backlight unit may be installed in a receiving module. The receiving module may be formed of an assembly of a mold frame and a bottom chassis. The mold frame may be disposed at an outer side of the backlight unit and the liquid crystal display panel. The bottom chassis may include a bottom portion disposed at a rear side of the mold frame and the backlight unit and a plurality of side walls connected to the bottom portion and facing the outer side of the mold frame. The receiving module may surround side and rear portions of the liquid crystal display panel and the backlight unit for protection.

With regard to the exemplary embodiments discussed above, the described technology relates to a receiving module supporting an LCD and a backlight unit, and a manufacturing method thereof. Embodiments may be realized by providing a receiving module that enhances mechanical strength by increasing a bonding force between a mold frame and a bottom chassis, a manufacturing method thereof, and a liquid crystal display including the same. According to exemplary embodiments, the side walls of the bottom chassis may be strongly combined with the corner portion of the mold frame so that mechanical strength of the receiving module may be enhanced. Accordingly, damage to the receiving module due to, e.g., external impact such as drop impact, may be reduced and/or minimized.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A receiving module, comprising:
a mold frame forming an internal space that receives a backlight unit;
a bottom chassis including a bottom portion facing a rear side of the mold frame, and including side walls connected with the bottom portion and facing an outer side of the mold frame;
wherein:
at least one of the side walls includes a fastening protrusion in at least one side thereof; and
the mold frame includes a groove portion that receives, at an outer side of the mold frame, the at least one side wall including the fastening protrusion such that the mold frame is coupled to an inner side of the side wall and the fastening protrusion.

2. The receiving module of claim 1, wherein the fastening protrusion is formed throughout two sides of the at least one side wall along a height direction of the side wall.

3. The receiving module of claim 2, wherein the groove portion has a depth substantially equal to a thickness of the side wall, and the groove portion includes a fastening groove portion having an opposite shape of the fastening protrusion.

4. The receiving module of claim 3, wherein the fastening protrusion has a shape of a triangular pyramid including two symmetric inclined planes.

5. The receiving module of claim 4, wherein the mold frame includes a fastening groove portion in the form of a concave recess having a shape of a triangular pyramid including two symmetric inclined planes,
wherein:
the shape of the recess of the fastening groove portion is complementary to the shape of the fastening protrusion, and
the fastening protrusion is engageable with the recess to fix the mold frame to the at least one of the side walls.

6. The receiving module of claim 3, wherein the fastening protrusion has a shape of a triangular wedge including a single inclined plane.

7. The receiving module of claim 6, wherein the mold frame includes a fastening groove portion in the form of a concave recess having a shape of a triangular wedge including a single inclined plane,
wherein:
the shape of the recess of the fastening groove portion is complementary to the shape of the fastening protrusion, and
the fastening protrusion is engageable with the recess to fix the mold frame to the at least one of the side walls.

8. A liquid crystal display, comprising:
a liquid crystal display panel that displays an image;
a backlight unit at a rear side of the liquid crystal display panel;
a mold frame at an outer side of the liquid crystal display panel and the backlight unit;
a bottom chassis including a bottom portion facing the mold frame and the rear side of the backlight unit and including side walls connected with the bottom portion and facing an outer side of the mold frame;
wherein:
at least one of the side walls includes a fastening protrusion in at least one side thereof, and
the mold frame includes a groove portion that receives, at an outer side of the mold frame, the at least one side wall including the fastening protrusion such that the mold frame is combined to an inner side of the side wall and the fastening protrusion.

9. The LCD of claim 8, wherein the fastening protrusion is formed throughout two sides of the at least one side wall along a height direction of the side wall.

10. The LCD of claim 9, wherein the groove portion has a depth that is substantially equal to a thickness of the side wall, and the groove portion includes a fastening groove portion having an opposite shape of the fastening protrusion.

11. The LCD of claim 10, wherein the fastening protrusion has a shape of a triangular pyramid having two symmetric inclined planes.

12. The LCD of claim 11, wherein the mold frame includes a fastening groove portion in the form of a concave recess having a shape of a triangular pyramid including two symmetric inclined planes,
wherein:
the shape of the recess of the fastening groove portion is complementary to the shape of the fastening protrusion, and
the fastening protrusion is engageable with the recess to fix the mold frame to the at least one of the side walls.

13. The LCD of claim 10, wherein the fastening protrusion has a shape of a triangular wedge having a single inclined plane.

14. The receiving module of claim 13, wherein the mold frame includes a fastening groove portion in the form of a concave recess having a shape of a triangular wedge including a single inclined plane,
wherein:
the shape of the recess of the fastening groove portion is complementary to the shape of the fastening protrusion, and
the fastening protrusion is engageable with the recess to fix the mold frame to the at least one of the side walls.

15. The LCD of claim 8, wherein the mold frame has a shape of a rectangular frame, and includes a receiving groove at an inner side thereof to support edges of the liquid crystal display panel.

* * * * *